US011600887B2

(12) United States Patent
Joswig et al.

(10) Patent No.: US 11,600,887 B2
(45) Date of Patent: Mar. 7, 2023

(54) PRESSURE RELIEF ELEMENT, PRESSURE RELIEF DEVICE AND BATTERY

(71) Applicant: CLARIOS ADVANCED SOLUTIONS GMBH, Hannover (DE)

(72) Inventors: Ralf Joswig, Buchholz (DE); Martin Wiegmann, Borstel (DE); Helge Brenner, Hannover (DE); Markus Hoh, Garbsen (DE); Kevin Chladek, Hannover (DE)

(73) Assignee: CLARIOS ADVANCED SOLUTIONS GMBH, Hannover (DE)

( * ) Notice: Subject to any disclaimer, the term of this patent is extended or adjusted under 35 U.S.C. 154(b) by 0 days.

(21) Appl. No.: 17/554,778

(22) Filed: Dec. 17, 2021

(65) Prior Publication Data

US 2022/0109213 A1    Apr. 7, 2022

Related U.S. Application Data

(63) Continuation of application No. 16/934,672, filed on Jul. 21, 2020, now Pat. No. 11,239,528, which is a
(Continued)

(51) Int. Cl.
*H01M 50/342* (2021.01)
*H01M 50/308* (2021.01)
(Continued)

(52) U.S. Cl.
CPC ..... *H01M 50/3425* (2021.01); *B29C 45/0081* (2013.01); *B65D 51/1638* (2013.01);
(Continued)

(58) Field of Classification Search
CPC ................................................ H01M 50/3425
See application file for complete search history.

(56) References Cited

U.S. PATENT DOCUMENTS

| 4,774,155 A | * | 9/1988 | Nientiedt | .......... H01M 50/3425 |
| | | | | 429/56 |
| 5,227,261 A | | 7/1993 | Georgopoulos | |

(Continued)

FOREIGN PATENT DOCUMENTS

| CN | 101170169 | 4/2008 |
| CN | 201725825 | 1/2011 |

(Continued)

OTHER PUBLICATIONS

Machine translation of JP 2004-178909, Jun. 2004.
Machine translation of JP 2007-027011, Feb. 2007.
Machine translation of DE 102008052284, Apr. 2010.
EP 12787445.1 Article 94(3) Communication dated Mar. 10, 2016.

*Primary Examiner* — Jonathan Crepeau
(74) *Attorney, Agent, or Firm* — Christopher & Weisberg, P.A.

(57) ABSTRACT

The present invention relates to a pressure relief element (11) to be used as an overpressure safety means in devices where a gaseous medium must be rapidly released in case of overpressure, wherein the pressure relief element (11) has at least one notch (9) which is designed as a predetermined breaking point where the pressure relief element (11) breaks at a certain level of overpressure, thereby irreversibly opening an exhaust path for the gaseous medium. The present invention also relates to a pressure relief device of an electrochemical battery, comprising such a pressure relief element and a battery comprising such a pressure relief device.

19 Claims, 5 Drawing Sheets

Related U.S. Application Data continuation of application No. 15/845,881, filed on Dec. 18, 2017, now Pat. No. 10,741,806, which is a continuation of application No. 14/359,040, filed as application No. PCT/EP2012/072851 on Nov. 16, 2012, now Pat. No. 9,871,235.

(60) Provisional application No. 61/560,646, filed on Nov. 16, 2011.

(51) Int. Cl.
  *B29C 45/00* (2006.01)
  *B65D 51/16* (2006.01)
  *H01M 50/30* (2021.01)
  *H01M 50/204* (2021.01)

(52) U.S. Cl.
  CPC ....... *H01M 50/308* (2021.01); *H01M 50/394* (2021.01); *B29C 2045/0094* (2013.01); *H01M 50/204* (2021.01); *H01M 2220/20* (2013.01)

(56) References Cited

U.S. PATENT DOCUMENTS

| | | |
|---|---|---|
| 9,118,061 B2 | 8/2015 | Kim et al. |
| 9,871,235 B2 | 1/2018 | Joswig et al. |
| 2004/0028995 A1 | 2/2004 | Shelekhin et al. |
| 2004/0043286 A1* | 3/2004 | Janmey ............ H01M 50/3425 429/174 |
| 2004/0191610 A1 | 9/2004 | Yoppolo et al. |
| 2007/0009785 A1 | 1/2007 | Kozuki et al. |
| 2008/0318121 A1 | 12/2008 | Takagi |

FOREIGN PATENT DOCUMENTS

| | | |
|---|---|---|
| CN | 201838638 | 5/2011 |
| DE | 102008052284 | 4/2010 |
| JP | 2004178909 | 6/2004 |
| JP | 2007027011 | 2/2007 |
| JP | 2011154957 | 8/2011 |

* cited by examiner

PRESSURE RELIEF ELEMENT, PRESSURE RELIEF DEVICE AND BATTERY

CROSS REFERENCE TO RELATED APPLICATIONS

This application is a continuation of U.S. patent application Ser. No. 16/934,672, entitled "PRESSURE RELIEF ELEMENT, PRESSURE RELIEF DEVICE AND BATTERY," filed Jul. 21, 2020, which is a continuation of U.S. patent application Ser. No. 15/845,881, entitled "PRESSURE RELIEF ELEMENT, PRESSURE RELIEF DEVICE AND BATTERY," filed Dec. 18, 2017, which is a continuation of U.S. patent application Ser. No. 14/359,040, entitled "PRESSURE RELIEF ELEMENT, PRESSURE RELIEF DEVICE AND BATTERY," filed May 16, 2014, which is a 35 U.S.C. § 371 Application of International Application No. PCT/EP2012/072851, entitled "PRESSURE RELIEF ELEMENT, PRESSURE RELIEF DEVICE AND BATTERY," filed Nov. 16, 2012, and claims priority from and the benefit of U.S. Provisional Application Ser. No. 61/560,646, entitled "VENTILATION FOR BATTERY SYSTEMS BY DINT OF A BURST MECHANISM," filed Nov. 16, 2011, which are hereby incorporated by reference in their entireties for all purposes.

BACKGROUND

The present invention relates to a pressure relief element to be used as an overpressure safety means according to claim 1. The present invention also relates to a pressure relief device of an electrochemical battery according to claim 12, comprising such a pressure relief element, and a battery according to claim 17, comprising such a pressure relief device.

SUMMARY

In several areas of technology there is a need for releasing an overpressure of a gaseous medium in a rapid manner, like in the area of pneumatic devices using compressed air or in the area of electrochemical batteries. Such batteries are increasingly used for hybrid and electric vehicles. Batteries for hybrid and electric vehicles need to allow pressure equalization in general, as in the case of an overload or short circuit large quantities of gas can be released. Even though in such battery systems normally a small cross-section is open anyway to allow a certain small air exchange during operation of the battery system, the small cross-section opening is not large enough for rapid gas release in cases of emergency. The small opening provides a small air exchange and keeps humidity inside and outside of the battery at the same level. In case of a rapid major increase in pressure within the battery a safety means is required for avoiding an explosion of the battery housing.

It is an object of the invention to provide an overpressure safety means for devices where a gaseous medium must be rapidly released in case of overpressure which can be easily and cheaply manufactured and used in a wide range of applications.

According to an embodiment, an object of the invention is achieved by a pressure relief element to be used as an overpressure safety means in devices where a gaseous medium must be rapidly released in case of overpressure, wherein the pressure relief element has at least one notch which is designed as a predetermined breaking point where the pressure relief element breaks at a certain level of overpressure, thereby irreversibly opening an exhaust path for the gaseous medium. The invention has the advantage that a one-time usable element is proposed which comprises a predetermined breaking point where the pressure relief element breaks and then remains in an irreversible opened state. Such pressure relief elements can be manufactured very cheaply and easily in different designs, both as an integrated pressure relief element which is an integral part of a pressure relief device or as a separate part which can be mounted within a pressure relief device. In the latter case, the pressure relief element can be an exchangeable part which can be replaced after breaking in the course of a repair action. The notch is designed in a way that the pressure relief element breaks at a predefined level or range of overpressure, e.g. a range with an upper and a lower boundary level of overpressure.

The pressure relief element can be a gas-permeable element which always allows a certain flow of gas, or it can be gas-tight before it breaks.

According to an advantageous embodiment of the invention the pressure relief element can be formed as a plate-like and/or disc-like part. In such case, a pressure relief element is provided which has a flat, thin shape. The outer contour of the pressure relief element can have a circular shape, an oval shape, a rectangular or square shape or any other shape suitable for the particular application.

Advantageously the pressure relief element can be made out of plastic material. This allows to combine cheap manufacturing, in particular for the mass production of pressure relief elements, with a determinable safe design of the breaking point in form of the at least one notch. In particular, it is possible to manufacture large numbers of the pressure relief element with current mass production technologies with a high repeat accuracy of the level of overpressure upon which the breaking point reacts.

According to an advantageous embodiment of the invention the pressure relief element comprises an injection side, the plastic material being injected into an injection mold during the manufacturing of the pressure relief element from the injection side, and the pressure relief element comprises a pressure side, which is arranged for being charged with the gaseous medium, wherein the injection side and the pressure side are opposite sides of the pressure relief element.

This allows for a reliable production of the pressure relief element out of plastic material with a high degree of fulfilment of specifications and a high degree of repeat accuracy.

According to an advantageous embodiment of the invention the pressure relief element comprises a profiled surface at least on one side in such manner that the material thickness of the pressure relief element is larger in the central area of the pressure relief element than in at least one area surrounding the central area. If the pressure relief element is a flat, plate-like element, it is possible to design both opposite sides of the pressure relief element with such a profiled surface or only one side. In the latter case, the other side can be designed as a flat, planar surface. In case the pressure relief element comprises the aforementioned injection side and the pressure side, it is advantageous to design the injection side as a side with such a profiled surface. It is particularly advantageous to design the profiled surface with smooth transitions between the areas of different material thicknesses. If this is realised on the injection side, the design of the pressure relief element supports the homogeneity of the plastic material. In particular, turbulences in the material during the injection process of the plastic material can be avoided. For example, it is advantageous to inject the plastic material from the central area of the pressure relief element to the surrounding areas.

According to an advantageous embodiment of the invention the material thickness of the pressure relief element can decrease in a declining manner from the central area towards the at least one area surrounding the central area. This allows for a smooth transition between the thicker central area to the thinner surrounding area. By the decrease of material thickness in a declining manner the tension within the pressure relief element can be controlled in such a way that the maximum tension occurs at the predetermined breaking point of the pressure relief element.

According to an advantageous embodiment of the invention the pressure relief element comprises a circumferential area of increased material thickness on its outer circumference. In this way, the pressure relief element can be designed with a more massive outer circumferential area which can be used for mounting and holding purposes, e. g. for holding the pressure relief element in a circular or else shaped holder device.

According to an advantageous embodiment of the invention the notch can be located close to the circumferential area with increased material thickness. Further, the notch can be shaped as a circumferential notch which surrounds the central area of the pressure relief element completely or partially.

According to an advantageous embodiment of the invention the plastic material of the pressure relief element can be a rigid plastic. The rigid plastic shall be selected from materials which are in their final, cured state relatively homogeneous and brittle or refractory. Advantageously a material is selected which has approximately the same behaviour in a certain temperature range, e. g. in the temperature range from −40° C. to 85° C.

The material thickness of the pressure relief element in the area of the predetermined breaking point can be a minimum thickness of e. g. 0.03 mm. For applications of the pressure relief element for battery systems for hybrid and electric vehicles, advantageously the overpressure upon which the breaking point reacts ranges from 0.5 to 1 bar (above atmosphere pressure).

According to an advantageous embodiment of the invention the pressure relief element can be a membrane, in particular a gas-permeable membrane.

According an embodiment, an object of the invention is achieved by a pressure relief device of an electrochemical battery, the pressure relief device comprising at least one pressure relief element as described herein before.

The pressure relief device can be designed in several ways, depending upon the requirements of the particular application. For example, the pressure relief device can comprise an exhaust extension which extends from the housing of the battery outwards, wherein the exhaust extension comprises at least one pressure relief element as described herein before. The exhaust extension can be designed in the form of a pipe with a circular or other cross section. The pressure relief element can be mounted within the exhaust extension as a separate part or can be made integrally with the material of the exhaust extension.

According to an advantageous embodiment of the invention the pressure relief device, in particular the exhaust extension, can comprise a tube connector for mounting a tube which allows constant pressure equalization between the interior and the exterior of the housing of the battery. In such case the pressure relief device or its exhaust extension can fulfil more than one function, making it a multifunctional device.

As a further function which can be realised by the pressure relief device or in particular by the exhaust extension, it can shield the pressure relief element against the ambience of the housing of the battery at least partly by means of a protection cap or maze. The protection cap or maze can particularly protect the pressure relief element against damage due to mechanical contacts or water/steam jet as used for vehicle cleaning. Also, the interior of the battery housing is protected by the cap or maze.

According to an advantageous embodiment of the invention the pressure relief device comprises a fixation element for fixing the exhaust extension to a housing wall of the housing of the battery in such manner that the exhaust extension is attached to the battery from the outside of the housing of the battery by inserting the exhaust extension through an opening in the housing wall of the housing of the battery and then attaching the fixation element to the exhaust extension from the inside of the housing of the battery. This allows for an easy and quick mounting of the pressure relief device on a housing wall of the housing of the battery.

An advantageous method of attaching the pressure relief device to the housing wall comprises the steps:
  inserting the exhaust extension through an opening in the housing wall of the housing of the battery,
  attaching the fixation element to the exhaust extension from the inside of 25 the housing of the battery.

According to an embodiment, an object of the invention is achieved by a battery with a battery housing and a plurality of electrochemical cells, wherein the cells each comprise an own cell housing, wherein the cells are located within the battery housing and wherein the battery housing comprises a pressure relief device as described herein before. Particularly, cells with own degassing and/or pressure relief elements integrated in the cell housing may be used. In such case the invention provides for a common pressure relief path through the pressure relief device for all cells mounted within the battery housing.

In a nutshell, the invention allows in the case of an increase of pressure within the battery that a part opens at a predetermined breaking point and releases a large cross-section as a gas outlet.

This invention enables the rapid pressure equalization between the battery and the environment when a cell releases a large amount of gas due to overload, short circuit, etc. The opening at the battery is sealed with a lid that has a notch. This notch serves as a predetermined breaking point. With increasing pressure, the breaking point cracks and a large cross-section gets open. The external area can be protected with additional ribs or a maze against mechanical damage due to contact or water/steam jet as used for vehicle cleaning. In addition, a small tube connector is provided which allows constant pressure equalization between interior and external battery. The element should preferably be made out of plastic—then with the hot gases the burst function will be supported by temperature. But it is also possible to use a metal part or a regular rupture disk of an external supplier in a kind of disc carrier. The design could also be a flange of any shape, which is bolted or clamped directly to the battery case or as shown at the images a cylindrical part that is attached to a pipe piece.

DRAWINGS

The invention is now further described through exemplary embodiments and through drawings.

The drawings show:

In the drawings, the same numerals refer to same elements.

DETAILED DESCRIPTION

Figure 1:
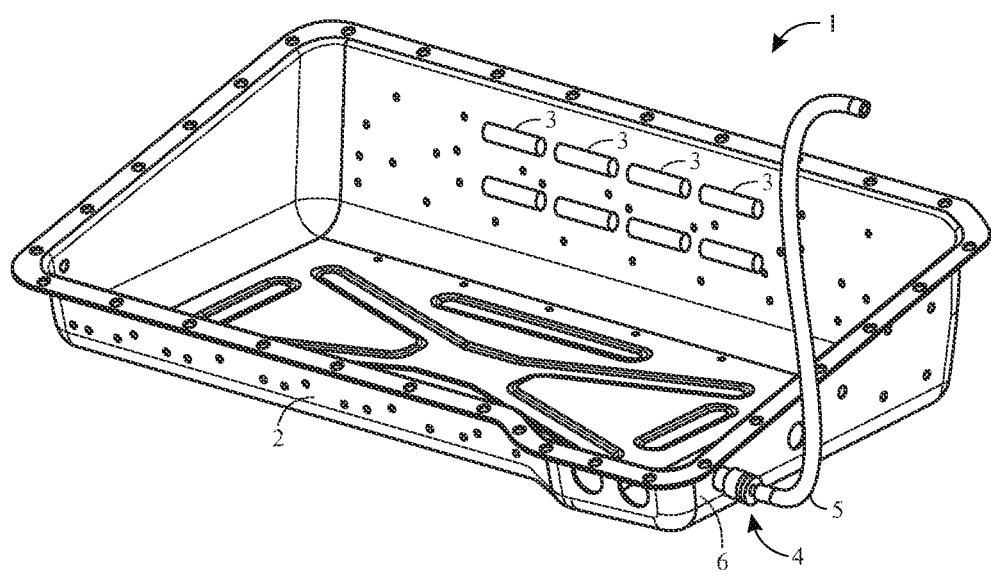
FIG. 1 shows a battery with a plurality of electrochemical cells

FIG. 1 shows an electrochemical battery 1 comprising a battery housing 2 and a plurality of electrochemical cells 3, which are located within the battery housing 2. The electrochemical cells 3 comprise own cell housings. The electrochemical cells 3 may be provided in the form of prismatic or cylindrical cells or any other suitable cell format. The housing 2 can be designed, as depicted in FIG. 1, like a bin or a tray. For applications in vehicles the housing 2 is normally made of metal material, but can also be made of lighter materials like resin or other plastic materials.

On the outside of the housing 2 a pressure relief device 4 is mounted. The pressure relief device 4 comprises a tube-like exhaust extension 7 which is fixed to the housing on a wall 6 of the housing 2. The exhaust extension 7 extends from the housing 2 of the battery 1 outwards and provides for a breathing channel between the interior of the housing 2 and the exterior, allowing air and moisture to exchange between the interior and the exterior of the housing 2. Further, in case of an overpressure within the housing 2, gases from the cells 3 could be released through the exhaust extension 7. The pressure relief device 4 comprises a pressure relief element 11 which is mounted on the outside of the exhaust extension 7. The pressure relief element 11 comprises an outer wall 8 which has a notch 9 which serves as a predetermined breaking point where the pressure relief element 11 breaks at a certain level of overpressure within the housing 2. The pressure relief device 4 comprises a tube connector 10 for mounting the tube 5, as shown in FIG. 1. The tube connector 10 can be located at the end of the pressure relief element 11 beyond the notch 9. As can be seen, the cross-section of the tube connector 10 as significantly smaller than the cross-section of the exhaust extension 7, which makes it necessary to provide the predetermined breaking point for safety reasons.

Figure 2:
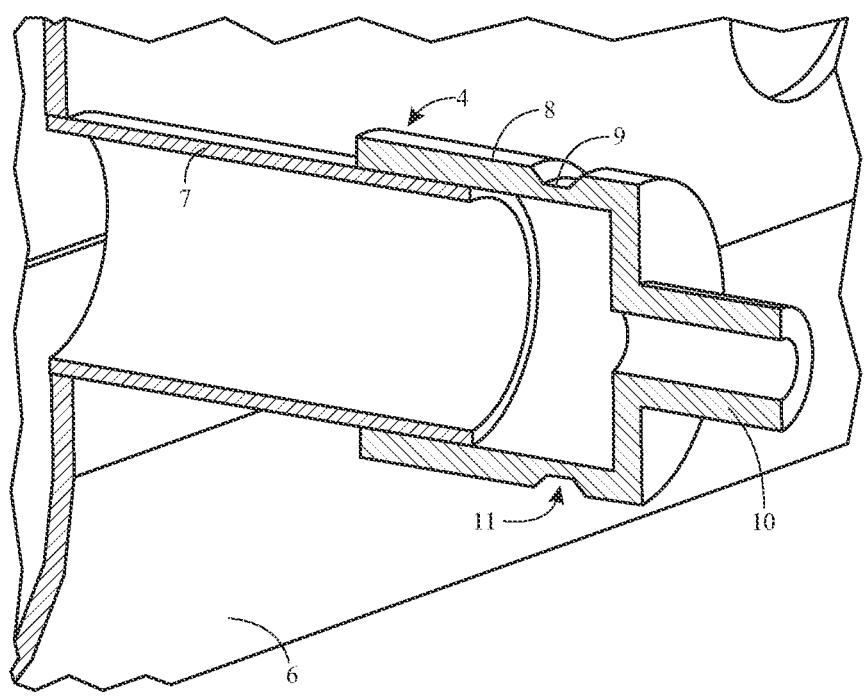
FIG. 2 shows a pressure relief device with integrated pressure relief element
Figure 3:
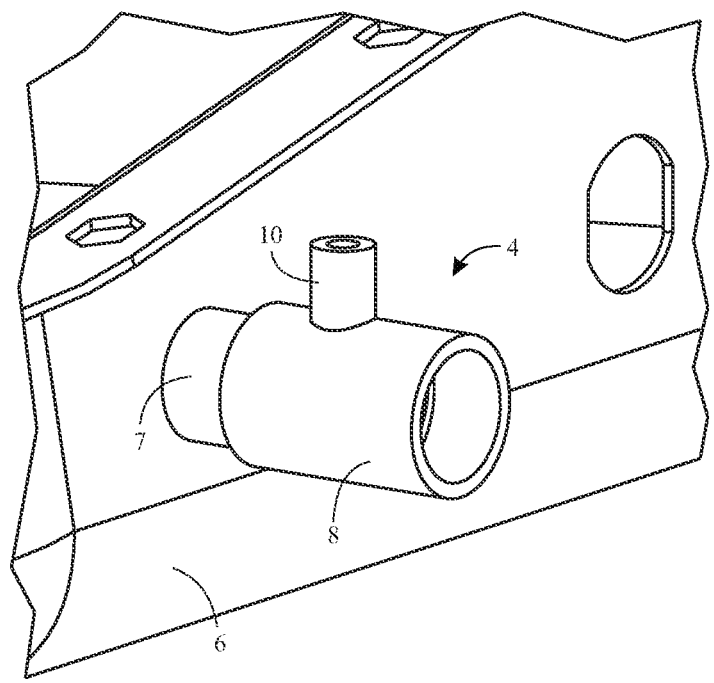
FIGS. 3-5 show another embodiment of a pressure relief device with integrated pressure relief element.
Figure 4:
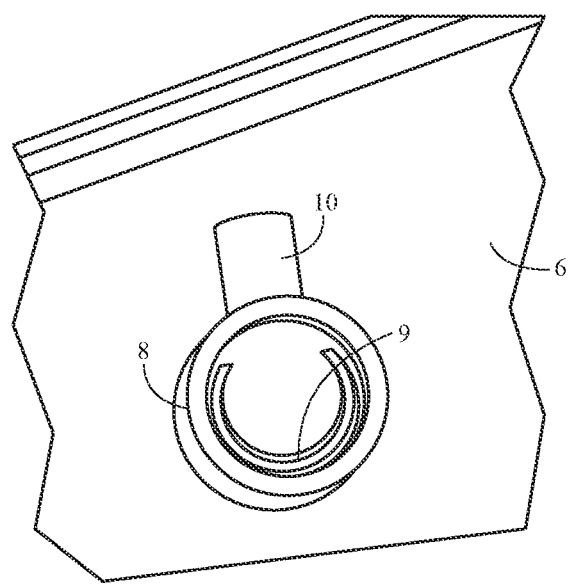
Figure 5:
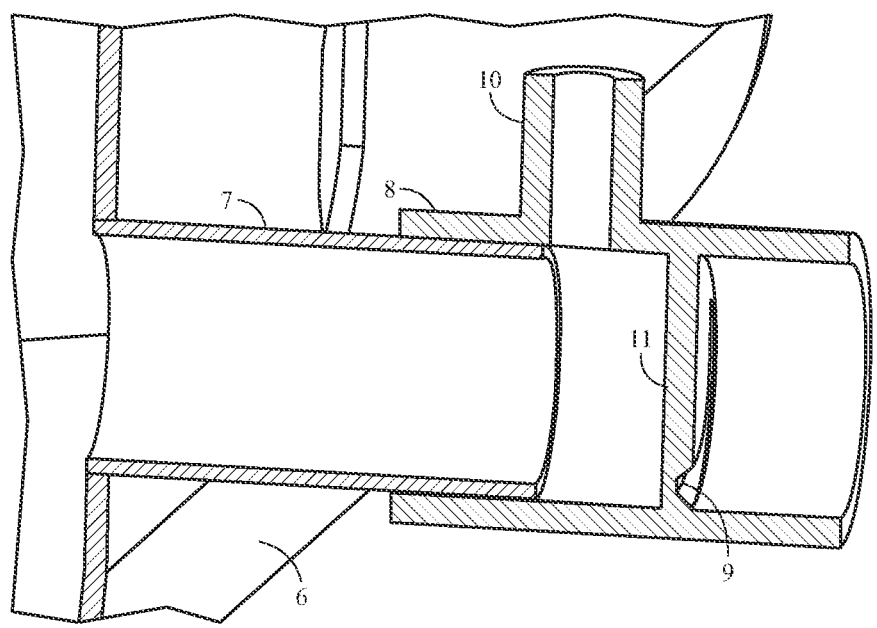

In the FIGS. 3 to 5 another embodiment of a pressure relief device 4 mounted to the housing wall 6 is depicted in different views. As can be seen, the pressure relief device 4 again comprises an exhaust extension 7 in similar manner as shown in FIG. 2. On the exhaust extension 7 a tube-like element with an outer wall 8 is mounted. On the outer wall 8 a tube connector 10 is located. Within the outer wall 8 a pressure relief device 11 in the form of a circular wall is located. The pressure relief element 11 again comprises a notch 9 as the predetermined breaking point. The notch 9 according to FIGS. 3 to 5 can be designed as a circular or semicircular groove, which completely or partially extends along the circumference of the pressure relief element 11.

In the embodiment of FIGS. 1 to 5 the pressure relief device 4 can be made integrally of the same material, like plastic material. It is also possible to provide separate parts e.g. for the exhaust extension 7 and the pressure relief element 11.

Figure 6:
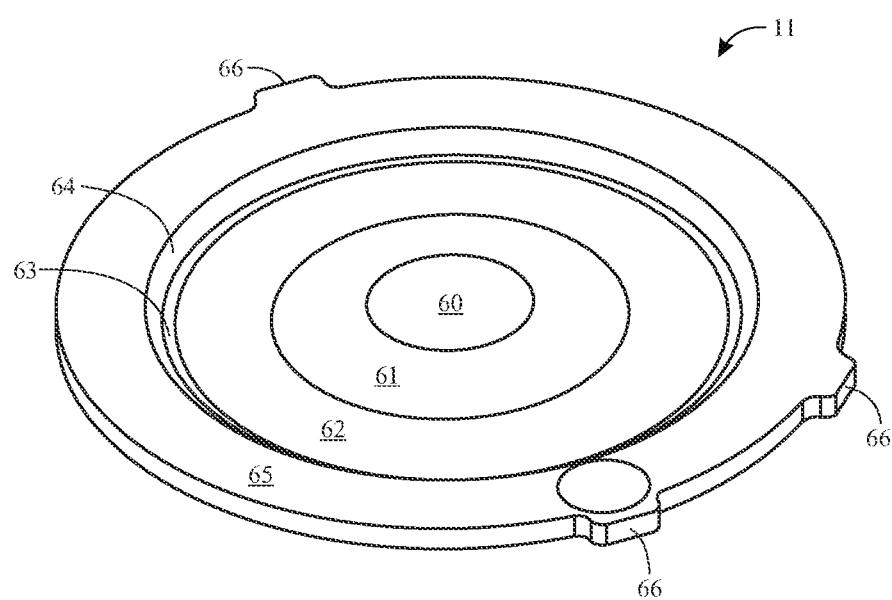
FIGS. 6 and 7 show a pressure relief element.
Figure 7:
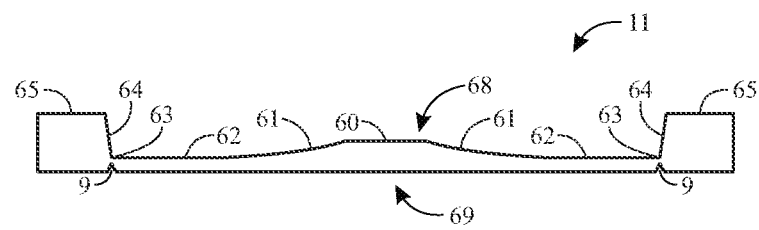

FIGS. 6 and 7 show an embodiment of a pressure relief element 11 as a separate part, in particular as a disk-like part made out of plastic material by an injection molding process. FIG. 6 shows the pressure relief element 11 in an isometric view, FIG. 7 shows a cross-sectional view. As can be seen in the 30 figures, the pressure relief element 11 comprises a generally flat lower side 69 and a profiled upper side 68 which is the opposite side of the lower side 69. The upper side 68 is an injection side of the pressure relief element 11, where the plastic material is injected into an injection mold during the manufacturing process of the pressure relief element 11. The profiled injection side 68 comprises a raised central area 60 with an increased material thickness. The plastic material is injected in the area 60 into the injection mold. Going from the central area 60 outwards, the material thickness decreases through areas 61, 62 smoothly, e. g. in a declining manner, until an outer circular position 63 is reached. Going beyond the position 63, the material thickness again increases in area 64 to form a raised outer circular area 65 of the pressure relief element 11 which can serve as a mounting element for mounting the pressure relief element in a pressure relief device. On the generally flat lower side 69, which is the side of the pressure relief element 11 which is to be charged with a gaseous medium, a notch 9 in the form of a circular notch is provided which acts as a predetermined breaking point of the pressure relief element 11. The material 15 thickness in the area of the notch 9 is e. g. only 0.03 mm.

Figure 8:
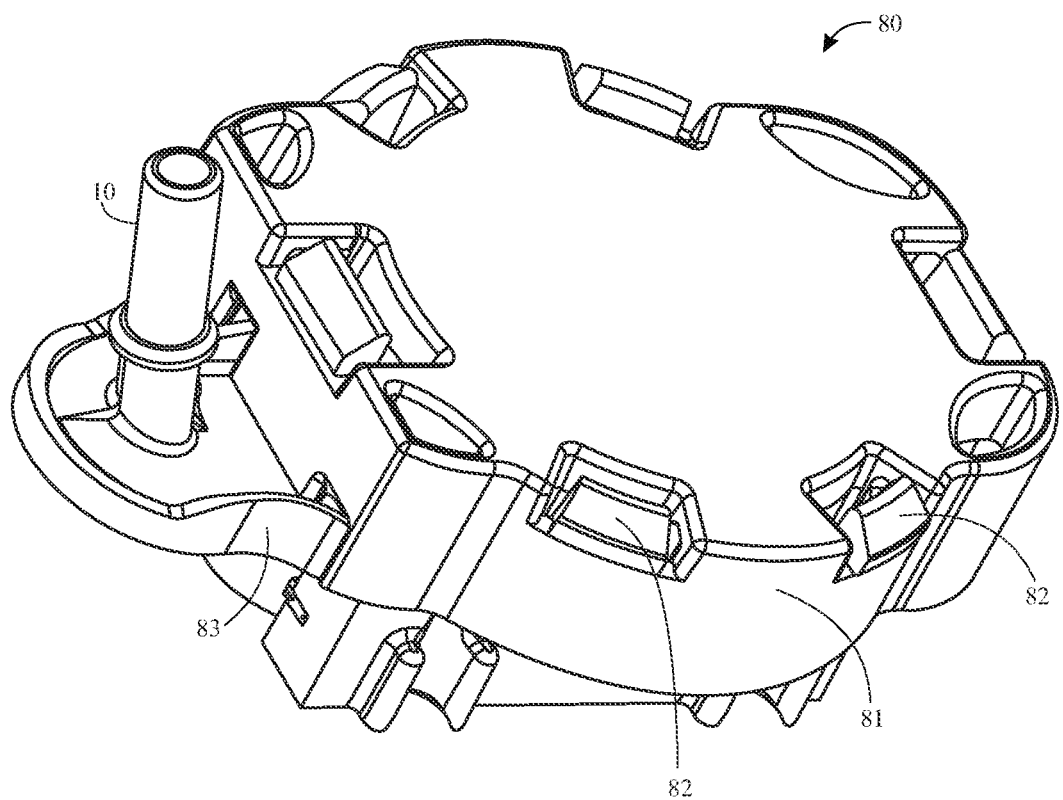
FIGS. 8 and 9 show another embodiment of a pressure relief device.
Figure 9:
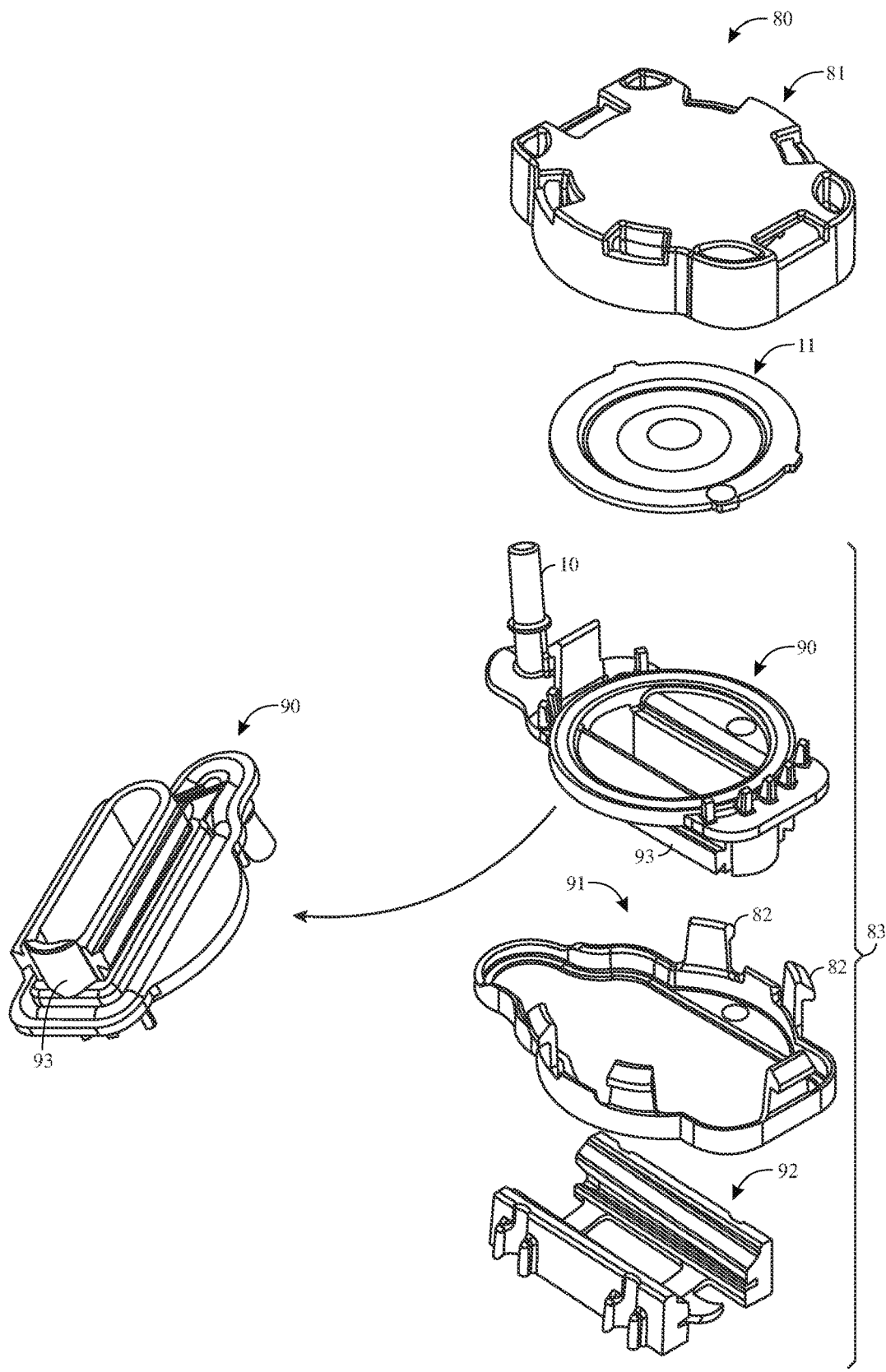

FIGS. 8 and 9 show another embodiment of a pressure relief device 80 composed of several separate parts which can be easily mounted to one another and to the housing wall 6. Further, the pressure relief device 80 according to FIGS. 8 and 9 is suitable for incorporating a pressure relief element 11 of FIGS. 6 and 7. FIG. 8 shows the completely mounted pressure relief device 80, FIG. 9 shows an explosional view of the pressure relief device 80.

The pressure relief device 80 of FIGS. 8 and 9 comprises a base part 83 composed of different elements shown in FIG. 9. As can be seen in FIG. 8, a protection cap 81 is mounted on the base part 83 by snap-hook elements 82. Further it can be seen that the base part 83 comprises a tube connector 10.

Going to FIG. 9, it can be seen that the pressure relief device 80 comprises 30 four separate parts plus a pressure relief element 11 according to FIGS. 6 and 7. The four elements are the already described protection cap 81 and the base element 83 comprising of a pressure relief element holder 90, a cap fixation part 91 and a fixation element 92 for mounting the pressure relief device 80 to the housing wall 6. For explanation purposes, the pressure relief element holder 90 is additionally shown in the left upper part of FIG. 9 from its bottom side.

The pressure relief device 80 according to FIGS. 8 and 9 can be mounted to the housing wall 6 of the housing 2 of the battery 1 in the following way. First, the pressure relief element 11 is placed on a reception side of the pressure relief element holder 90. Then the pressure relief element holder 90 with the pressure relief element 11 is placed within the cap fixation part 91 and then the protection cap 81 is fixed on the cap fixation part 91 by means of the snaphooks 82. In such way, the pressure relief element 11 is encapsulated between the pressure relief element holder 90 and the protection cap 81, while the pressure relief element holder 90 is encapsulated between the cap fixation part 91 and the protection cap 81. The unit comprising of elements 11, 81, 90, 91 can then be inserted through an opening in the housing wall 6 of the housing 2. Then, the fixation element 92 is attached to a mechanical link element 93 of the pressure relief element holder 90. The mechanical link element 93 is designed to extend through the cap fixation part 91 and the housing wall 6 to the inside of the housing 2. The mechanical link 93 can be designed e. g. as a duff-tail link.

Those reviewing this disclosure will appreciate that various exemplary embodiments have been shown and described, and that according to various exemplary embodiments, features associated with one exemplary embodiment may be used with features included in other exemplary embodiments.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the battery module having electrochemical cells with integrally formed terminals as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, the battery may be noncylindrical (e.g., oval, rectangular, etc.), the position of elements may be reversed or otherwise varied (e.g., orientation of terminals), and the battery could be a number of different of types (e.g., nickel metal hydride, lithium ion, lithium polymer, etc.). Accordingly, all such modifications are intended to be included within the scope of the present inventions. The order or sequence of any process or method steps may be varied or re-sequenced according to exemplary embodiments. Other substitutions, modifications, changes and omissions may be made in the design, operating conditions and arrangement of the various exemplary embodiments without departing from the scope of the present invention.

What is claimed is:

1. A pressure relief device of a battery, the pressure relief device comprising:
    a first base having an opening;
    a pressure relief disk disposed in the opening of the first base, the pressure relief disk being replaceable, having a thickness and comprising:
        a raised central portion;
        a raised outer portion having a second base;
        a first side; and
        a second side, opposite the first side, the thickness of the pressure relief disk decreasing from the raised central portion to the second base of the raised outer portion, the second side comprising a notch that defines a predetermined breaking point between the raised central portion and the raised outer portion of the pressure relief disk; and
    a cap being releasably coupled to the first base and sealing the pressure relief disk against the first base.

2. The pressure relief device of claim 1, wherein the first side of the pressure relief disk has a contoured surface.

3. The pressure relief device of claim 2, wherein the thickness of the pressure relief disk steadily decreases from the raised central portion to the second base of the raised outer portion to define the contoured surface.

4. The pressure relief device of claim 1, wherein the second side has a flat surface portion.

5. The pressure relief device of claim 1, wherein the notch is disposed where the raised outer portion meets a remainder portion of the pressure relief disk.

6. The pressure relief device of claim 1, wherein the first base includes:
    a pressure relief disk holder having a reception side arranged to receive the pressure relief disk when disposed in the opening of the first base, at least a portion of the second base of the raised outer portion of the pressure relief disk being in physical contact with the reception side.

7. The pressure relief device of claim 6, wherein the pressure relief disk holder further has at least a coupling element couplable to the cap.

8. The pressure relief device of claim 6, wherein the first base further includes:
    a cap fixation part having at least another coupling element couplable to the cap, the cap fixation part being arranged to:
        receive the pressure relief disk holder; and
        secure the pressure relief disk holder between the cap fixation part and the cap when the at least other coupling element is coupled to the cap.

9. The pressure relief device of claim 6, wherein the pressure relief disk holder includes a coupling portion, and the first base further includes a mechanical link couplable at least to the coupling portion of the pressure relief disk holder.

10. The pressure relief device of claim 9, wherein the first base further includes a fixation element couplable to the mechanical link of the first base and the battery, the fixation element including at least at least a channel to couple to the mechanical link.

11. The pressure relief device of claim 6, wherein the pressure relief disk holder further includes a tube connector at an end of the pressure relief device, the pressure relief device being couplable to the battery and configured to provide pressure relief to the battery using at least the tube connector and a tube coupled to the tube connector to provide constant pressure equalization between an interior and an exterior of the battery.

12. The pressure relief device of claim 11, wherein the pressure relief device is couplable to the battery by being couplable at least to an exhaust extension of the battery.

13. The pressure relief device of claim 1, wherein the cap includes at least one opening including a coupling receiver arranged to receive and couple at least one coupling element of the first base.

14. The pressure relief device of claim 1, wherein the pressure relief disk is an injection molded pressure relief disk.

15. The pressure relief device of claim 14, wherein the first side is an injection side of the injection molded pressure relief disk.

16. The pressure relief device of claim 1, wherein the notch is a circumferential notch that one of surrounds a portion of the raised central portion and surrounds an entirety of the raised central portion.

17. The pressure relief device of claim 1, wherein the first side is arranged to be in fluid communication with an exterior of a housing of the battery, and the second side is arranged to be in fluid communication with an interior of the housing of the battery.

18. The pressure relief device of claim 17, wherein the notch is configured to break at a predetermined level of overpressure of a gaseous medium in the interior of the housing of the battery to irreversibly open an exhaust and cause the gaseous medium to exit the interior of the housing of the battery.

19. The pressure relief device of claim 1, wherein the notch defines the predetermined breaking point radially between the raised central portion and the raised outer portion of the pressure relief disk.

* * * * *

UNITED STATES PATENT AND TRADEMARK OFFICE
CERTIFICATE OF CORRECTION

PATENT NO. : 11,600,887 B2
APPLICATION NO. : 17/554778
DATED : March 7, 2023
INVENTOR(S) : Joswig et al.

It is certified that error appears in the above-identified patent and that said Letters Patent is hereby corrected as shown below:

In the Specification

1. In Column 1, Line 10, delete "2020," and insert -- 2020, now Pat. No. 11,239,528, --, therefor.

2. In Column 1, Line 13, delete "2017," and insert -- 2017, now Pat. No. 10,741,806, --, therefor.

3. In Column 1, Line 16, delete "May 16, 2014," and insert -- July 30, 2014, --, therefor.

4. In Column 3, Line 46, delete "According" and insert -- According to --, therefor.

5. In Column 4, Line 41, delete "for a" and insert -- a --, therefor.

6. In Column 4, Line 45, delete "that a" and insert -- a --, therefor.

7. In Column 4, Line 66, delete "a" and insert -- of a --, therefor.

8. In Column 5, Line 1, delete "DRAWINGS" and insert -- BRIEF DESCRIPTION OF THE DRAWINGS --, therefor.

9. In Column 5, Line 7, delete "cells" and insert -- cells; --, therefor.

10. In Column 5, Line 9, delete "element" and insert -- element; --, therefor.

11. In Column 5, Line 12, delete "element and," and insert -- element; and --, therefor.

12. In Column 5, Line 36, delete "for a" and insert -- a --, therefor.

13. In Column 5, Line 51, delete "as" and insert -- is --, therefor.

14. In Column 6, Line 38, delete "is" and insert -- are --, therefor.

Signed and Sealed this
Twenty-third Day of May, 2023

Katherine Kelly Vidal
*Director of the United States Patent and Trademark Office*

15. In Column 6, Line 48, delete "four" and insert -- of four --, therefor.

16. In Column 8, Line 4, delete "of types" and insert -- types --, therefor.

In the Claims

17. In Column 9, Line 7, in Claim 10, delete "at least at least" and insert -- at least --, therefor.

18. In Column 10, Line 5, in Claim 16, delete "that one of" and insert -- that --, therefor.